(12) United States Patent
Kerner et al.

(10) Patent No.: US 9,153,261 B1
(45) Date of Patent: Oct. 6, 2015

(54) DAMPERS FOR ACTUATOR ASSEMBLY OF HARD DISK DRIVE

(71) Applicant: HGST Netherlands B.V., Amsterdam (NL)

(72) Inventors: Jeffrey Kerner, San Jose, CA (US); Manoj B. Keshavan, San Jose, CA (US)

(73) Assignee: HGST NETHERLANDS B.V., Amsterdam (NL)

( * ) Notice: Subject to any disclaimer, the term of this patent is extended or adjusted under 35 U.S.C. 154(b) by 0 days.

(21) Appl. No.: 14/245,932

(22) Filed: Apr. 4, 2014

(51) Int. Cl.
*G11B 5/48* (2006.01)
*B32B 7/12* (2006.01)

(52) U.S. Cl.
CPC ............... *G11B 5/4833* (2013.01); *B32B 7/12* (2013.01)

(58) Field of Classification Search
CPC .................................. G11B 5/4833; B32B 7/12
USPC .............. 360/265.7, 265.8, 265.9, 266, 266.1
See application file for complete search history.

(56) References Cited

U.S. PATENT DOCUMENTS

| | | | |
|---|---|---|---|
| 5,801,905 A * | 9/1998 | Schirle et al. ............. | 360/265.9 |
| 5,999,374 A | 12/1999 | Kim | |
| 6,091,574 A | 7/2000 | Misso | |
| 6,608,732 B2 | 8/2003 | Bernett et al. | |
| 6,724,566 B2 | 4/2004 | Kant et al. | |
| 6,879,467 B2 * | 4/2005 | Shimizu et al. ............. | 360/265.9 |
| 6,947,260 B2 | 9/2005 | Dominguez et al. | |
| 7,119,993 B2 | 10/2006 | Zuo et al. | |
| 7,859,795 B2 | 12/2010 | Kerner et al. | |
| 7,990,657 B2 | 8/2011 | Fu et al. | |
| 8,068,309 B2 | 11/2011 | MacKinnon et al. | |
| 8,259,418 B2 | 9/2012 | Koganezawa | |
| 8,432,641 B1 | 4/2013 | Nguyen | |
| 2005/0152070 A1 * | 7/2005 | Funabashi et al. ......... | 360/265.7 |
| 2011/0211280 A1 * | 9/2011 | Chen et al. ................... | 360/254 |
| 2012/0162826 A1 | 6/2012 | Sudo et al. | |

OTHER PUBLICATIONS

Blount, Noise Reduction Using Dampening in Voice Coil Motors/Actuators of Hard Disk Drives, IBM Storage Technology, Oct. 2001.

* cited by examiner

*Primary Examiner* — Angel Castro
(74) *Attorney, Agent, or Firm* — Kunzler Law Group, PC

(57) ABSTRACT

An actuator assembly for a magnetic storage device includes a top surface and a bottom surface that opposes the top surface. The actuator assembly also includes a first constraining layer that is secured to the top surface by a first adhesive layer. The first adhesive layer is positioned between the top surface and the first constraining layer. Additionally, the actuator assembly includes a second constraining layer that is secured to the bottom surface by a second adhesive layer. The second adhesive layer is positioned between the bottom surface and the second constraining layer. At least one of (i) the first constraining layer is configured differently than the second constraining layer; and (ii) the first adhesive layer is configured differently than the second adhesive layer.

20 Claims, 4 Drawing Sheets

DAMPERS FOR ACTUATOR ASSEMBLY OF HARD DISK DRIVE

FIELD

This disclosure relates generally to electronic information storage devices, and more particularly to reducing vibrations of components of information storage devices.

BACKGROUND

Hard disk drives ("HDDs") are widely used to store digital data or electronic information for enterprise data processing systems, computer workstations, portable computing devices, digital audio players, digital video players, and the like. Generally, HDDs store data on a disk with a layer of magnetic material. A transducer head, e.g., read-write head, includes a writing component that magnetically polarizes areas or bits of the magnetic material with one or two polarities to encode either binary zeros or ones. Thus, data is recorded as magnetically encoded areas or bits of magnetic polarity. The direction of the magnetization points in different directions, which can be referred to as a positive state and a negative state. Each bit can store information (generally binary information in the form of either a 1 or a 0) according to the magnetic polarization state of the bit. Typically, bits are arranged along respective radially-adjacent (e.g., concentric) annular tracks of a disk. A single disk can include space for millions of tracks each with millions of bits. A transducer head also includes a reading component that detects the magnetic polarity of each bit or area and generates an electrical signal that approximates the magnetic polarity. The signal is processed to recover the binary data recorded on the magnetic material.

The disks of an HDD rotate as transducer heads hover over the respective disks to read data from and write data to the disks. Rotation of the disks is driven by a spindle motor that is rotatably coupled to the disks via a central spindle. The position of the transducer heads relative to the disks, and the location on the disks from which data is read or to which data is written, is controlled via actuation of an actuator. The actuator controls the movement of the plurality of armatures each securing a respective one of the transducer heads. As the disks rotate, the actuator actuates to rotate the armatures and move the transducer heads radially inwardly or outwardly over the disks.

The dynamic performance of an HDD is a major mechanical factor for achieving higher data capacity as well as for manipulating the data faster. The quantity of data tracks recorded on the disk surface is determined partly by how well the transducer heads and a desired data track can be positioned relative to each other and made to follow each other in a stable and controlled manner. There are many factors that can influence the ability of an HDD to perform the function of positioning the transducer heads and following the data track with the heads. One such factor is undesirable motions that can come about through unwanted vibrations of components of the HDD.

SUMMARY

A need exists for an apparatus and system for reducing the vibration of the components of an HDD that overcomes the shortcomings of conventional HDDs. The subject matter of the present application has been developed in response to the present state of HDD art, and in particular, in response to problems and needs in the art that have not yet been fully solved by currently available HDDs.

According to one embodiment, an actuator assembly for a magnetic storage device includes a top surface and a bottom surface that opposes the top surface. The actuator assembly also includes a first constraining layer that is secured to the top surface by a first adhesive layer. The first adhesive layer is positioned between the top surface and the first constraining layer. Additionally, the actuator assembly includes a second constraining layer that is secured to the bottom surface by a second adhesive layer. The second adhesive layer is positioned between the bottom surface and the second constraining layer. At least one of (i) the first constraining layer is configured differently than the second constraining layer; and (ii) the first adhesive layer is configured differently than the second adhesive layer.

In some implementations of the actuator assembly, the first and second constraining layers each includes a rigid sheet. The rigid sheet can be made from a metallic material.

According to certain implementations of the actuator assembly, the first constraining layer is configured differently than the second constraining layer. The first constraining layer can be made from a first material and the second constraining layer can be made from a second material that is different than the first material. The first constraining layer can have a first thickness and the second constraining layer can have a second thickness that is different than the first thickness. The first constraining layer can have a first shape and the second constraining layer can have a second shape that is different than the first shape. According to one implementation, the first and second adhesive layers are configured the same.

In certain implementations of the actuator assembly, the first and second adhesive layers each is made from a visco-elastic adhesive. The first and second adhesive layers can have a lower stiffness than the first and second constraining layers, respectively, in some implementations.

According to yet some implementations of the actuator assembly, the first adhesive layer is configured differently than the second adhesive layer. The first adhesive layer can be made from a first adhesive and the second adhesive layer can be made from a second adhesive that is different than the first adhesive. The first adhesive layer can have a first thickness and the second adhesive layer can have a second thickness that is different than the first thickness. The first adhesive layer can have a first shape and the second adhesive layer can have a second shape that is different than the first shape. The first and second constraining layers can be configured the same.

In some implementations of the actuator assembly, the first constraining layer is configured differently than the second constraining layer, and the first adhesive layer is configured differently than the second adhesive layer.

According to certain implementations, the actuator assembly can also include at least one armature that supports a read-write head. The top surface is a top surface of the at least one armature and the bottom surface is a bottom surface of the at least one armature.

The actuator assembly can include a coil support in some implementations. In such implementations, the top surface can be a top surface of the coil support and the bottom surface can be a bottom surface of the coil support.

In yet another embodiment, a magnetic storage device includes at least one magnetic disk and at least one armature that is rotatably movable relative to the at least one magnetic disk. The at least one armature includes a first surface and a second surface that opposes the first surface. The magnetic storage device also includes a first vibration damper that is secured to the first surface. The first vibration damper includes a first constraining layer and a first adhesive layer that is positioned between the first surface and the first constraining layer. The magnetic storage device additionally includes a second vibration damper that is secured to the second surface. The second vibration damper includes a second constraining layer and a second adhesive layer that is positioned between the second surface and the second constraining layer. The first vibration damper is configured differently than the second vibration damper.

According to another embodiment, an apparatus for damping vibrations in an actuator assembly for a magnetic storage device is described. The actuator assembly includes a top surface and a bottom surface that opposes the top surface. The apparatus includes a first rigid sheet that is secured to the top surface by a first visco-elastic adhesive. The first visco-elastic adhesive is positioned between the top surface and the first rigid sheet. The apparatus also includes a second rigid sheet that is secured to the bottom surface by a second visco-elastic adhesive. The second visco-elastic adhesive is positioned between the bottom surface and the second rigid sheet. The first rigid sheet is configured differently than the second rigid sheet, and the first visco-elastic adhesive is configured differently than the second visco-elastic adhesive.

Reference throughout this specification to features, advantages, or similar language does not imply that all of the features and advantages that may be realized with the present disclosure should be or are in any single embodiment. Rather, language referring to the features and advantages is understood to mean that a specific feature, advantage, or characteristic described in connection with an embodiment is included in at least one embodiment of the subject matter disclosed herein. Thus, discussion of the features and advantages, and similar language, throughout this specification may, but do not necessarily, refer to the same embodiment.

The described features, structures, advantages, and/or characteristics of the subject matter of the present disclosure may be combined in any suitable manner in one or more embodiments and/or implementations. In the following description, numerous specific details are provided to impart a thorough understanding of embodiments of the subject matter of the present disclosure. One skilled in the relevant art will recognize that the subject matter of the present disclosure may be practiced without one or more of the specific features, details, components, materials, and/or methods of a particular embodiment or implementation. In other instances, additional features and advantages may be recognized in certain embodiments and/or implementations that may not be present in all embodiments or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended claims, or may be learned by the practice of the subject matter as set forth hereinafter.

BRIEF DESCRIPTION OF THE DRAWINGS

In order that the advantages of the disclosure will be readily understood, a more particular description of the disclosure briefly described above will be rendered by reference to specific embodiments that are illustrated in the appended drawings. Understanding that these drawings depict only typical embodiments of the disclosure and are not therefore to be considered to be limiting of its scope, the subject matter of the present application will be described and explained with additional specificity and detail through the use of the accompanying drawings, in which.

DETAILED DESCRIPTION

Figure 1:
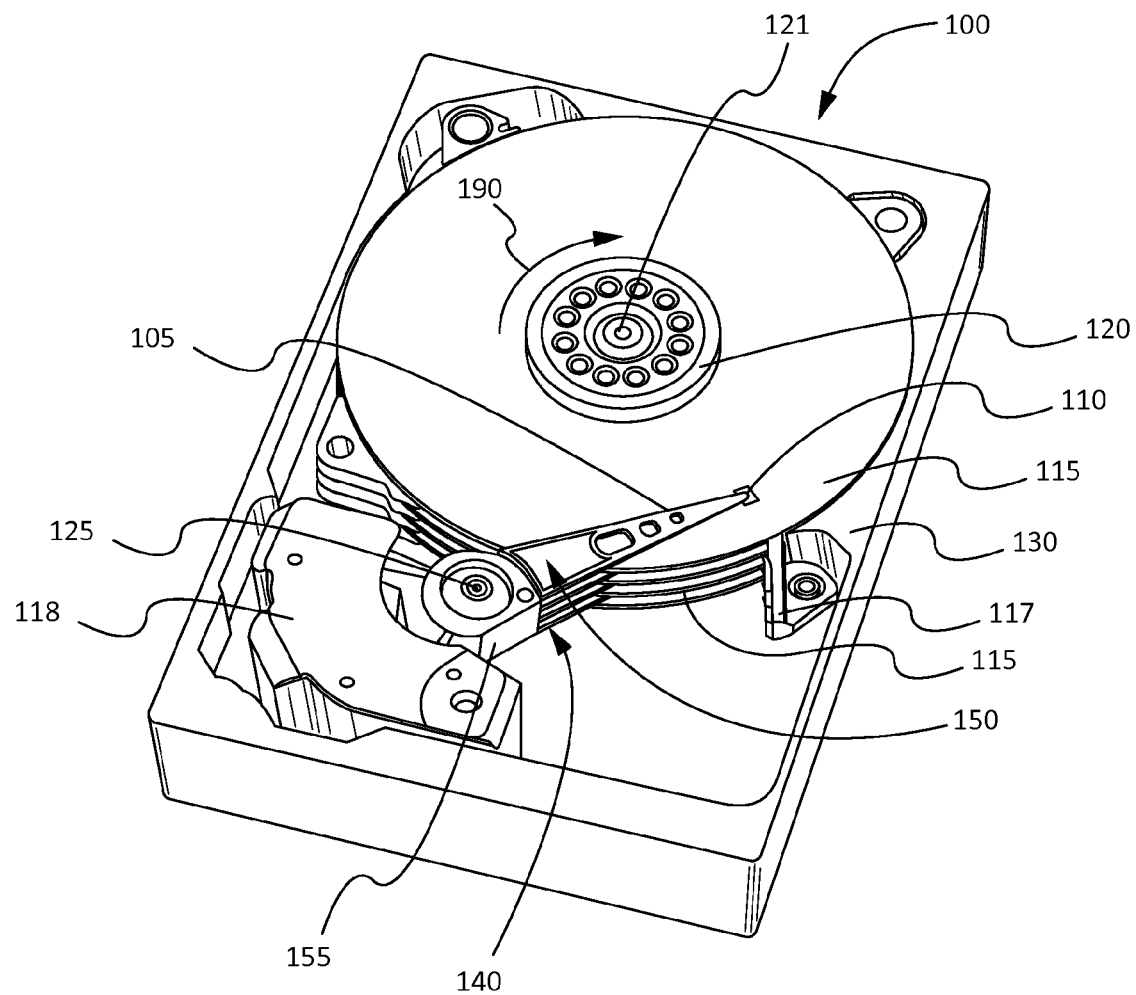
FIG. 1 is a perspective view of a magnetic storage device with vibration dampers according to one embodiment.

Referring to FIG. 1, a magnetic storage device 100, according to one embodiment, is depicted as a hard disk drive (HDD). The HDD can be configured similarly to a conventional HDD as depicted generally in the illustrated embodiments. Alternatively, the HDD can be configured similarly to a so-called hybrid HDD that includes a combination of flash media and magnetic disk media. In yet other embodiments, the magnetic storage device 100 can be another type of magnetic storage device, or yet another type of data storage device, such as an optical recording device. Basically, the HDD 100 includes an actuator assembly 140, one or more disks 115, a spindle 121 driven by a spindle motor, and a base 130. The base 130 forms part of a housing, shown with a cover removed, that contains internal components of the HDD within the housing.

The actuator assembly 140 includes a plurality of armatures 105 coupled to a base 155, transducer heads 110, an actuator 118, a yoke assembly 142 (see, e.g., FIG. 2), and a spindle 125. Each transducer head 110 is secured to an end portion 107 of a respective armature 105 (a second transducer head attached to each armature is not shown). Although the HDD 100 is shown having four armatures 105, one transducer head 110 per armature, four disks 115, and one yoke assembly, any number of armatures, heads, disks, and yoke assemblies may be employed.

The armatures 105 extend parallel to each other away from the base 155 to cantilevered end portions 107. Each armature 105 is a relatively thin plate-like element, which has a width that, in certain implementations, decreases in a direction extending away from the base 155. The armatures 105 are spaced apart vertically (e.g., top-to-bottom direction) such that a disk 115 can be positioned between adjacent armatures. In some instances, the armatures 105 are spaced an equal distance apart from each other. Each armature 105 defines a top surface 157 and a bottom surface 161 that opposes the top surface. In certain implementations, the top and bottom surfaces 157, 161 oppose each other when they define generally opposite sides of the corresponding armature 105. According to certain implementations, the top and bottom surfaces 157, 161 oppose each other when the top and bottom surfaces are parallel to each other, and spaced apart from each other by a thickness of the corresponding armature 105. The opposing surfaces can, but need not, be flat. The armatures 105 may include apertures for attachment of other components or for weight saving purposes. The apertures can extend from the top surface 157 to the bottom surface 161 of each armature. In some embodiments, the armatures 105 are integrally formed with the base 155 such that they form a monolithic one-piece construction with the base. In other embodiments, the armatures 105 are formed separate from the base 155 and coupled to the base in a separate processing step via any of various coupling techniques.

The yoke assembly 142 includes coil supports 158 and a coil 171 coupled to the coil supports. The coil supports 158 can be arms that are coupled to and extend away from the base 155. The coil supports 158 are spaced-apart to support the coil 171 between the coil supports. Although the coil supports 158 extend only partially around a periphery of the coil 171, in some implementations, the coil supports 158 may extend entirely around a periphery of the coil. Like the armatures 105, each coil support 158 defines a top surface 159 and a bottom surface 163 that opposes the top surface. In some embodiments, the coil supports 158 are integrally formed with the base 155 such that they form a monolithic one-piece construction with the base. In other embodiments, the coil supports 158 are formed separate from the base 155 and coupled to the base in a separate processing step via any of various coupling techniques.

The coil 171 includes an electrically-conductive wire wrapped about itself in a coiled configuration. The actuator 118 interacts with the coil 171 to rotate the coil, as well as the base 155 and armatures 105, about the spindle 125. In one implementation, the actuator 118 passes current through the coil 171, which results in a torque applied to the actuator. The base 155 includes an aperture 127 that receives the spindle 125. The aperture 127 is configured to retain the spindle 125 and allow rotation of the base 155 relative to the spindle.

The armatures 105, base 155, and coil supports 158 are made from a substantially rigid material. For example, in one embodiment, one or more of the armatures 105, base 155, and coil supports 158 is made from a metal, such as aluminum. In other embodiments, one or more of the armatures 105, base 155, and coil supports 158 is made from another substantially rigid material, such as ceramic, composite, polymer, and the like.

The spindle 121 is operably connected to the base 130 via the spindle motor, which is coupled to the base. The spindle 121 is co-rotatably coupled to the spindle motor such that the spindle motor rotatably drives the spindle. Accordingly, the spindle 121 can be considered to be part of or integral with the spindle motor. The disks 115 are operably connected to the spindle 121 via respective hubs 120 fixedly secured to respective disks and co-rotatably coupled to the spindle. In this manner, the spindle 121 defines a central axis of each disk 115. As the spindle 121 rotates, the disks 115 correspondingly rotate as indicated by directional arrow 190. Accordingly, the spindle motor can be operatively controlled to rotate the disks 115 a controlled amount and at a controlled rate. The disks 115 can include magnetic recording media organized into a plurality of tracks that store data.

As the disks 115 rotate, the actuator 118 positions the armatures 105 and the heads 110 connected to each armature, such that the heads are positioned over a specified radial area of the disks for read or write operations. In an idle mode, the actuator 118 is controlled to position the armatures 105 radially outwardly such that each head is parked or unloaded onto a ramp support 117 secured to the base.

The HDD 100 may also include an electrical hardware board mounted to the base 130. In this manner, the electrical hardware board is on-board or contained within the HDD 100, as opposed to forming part of an electrical device external to or separate from the HDD. Generally, the electrical hardware board includes hardware and/or circuitry used to control operation of the various components of the HDD 100. The electrical hardware board may include a printed circuit board on or in which the hardware and/or circuitry is mounted.

Figure 2:
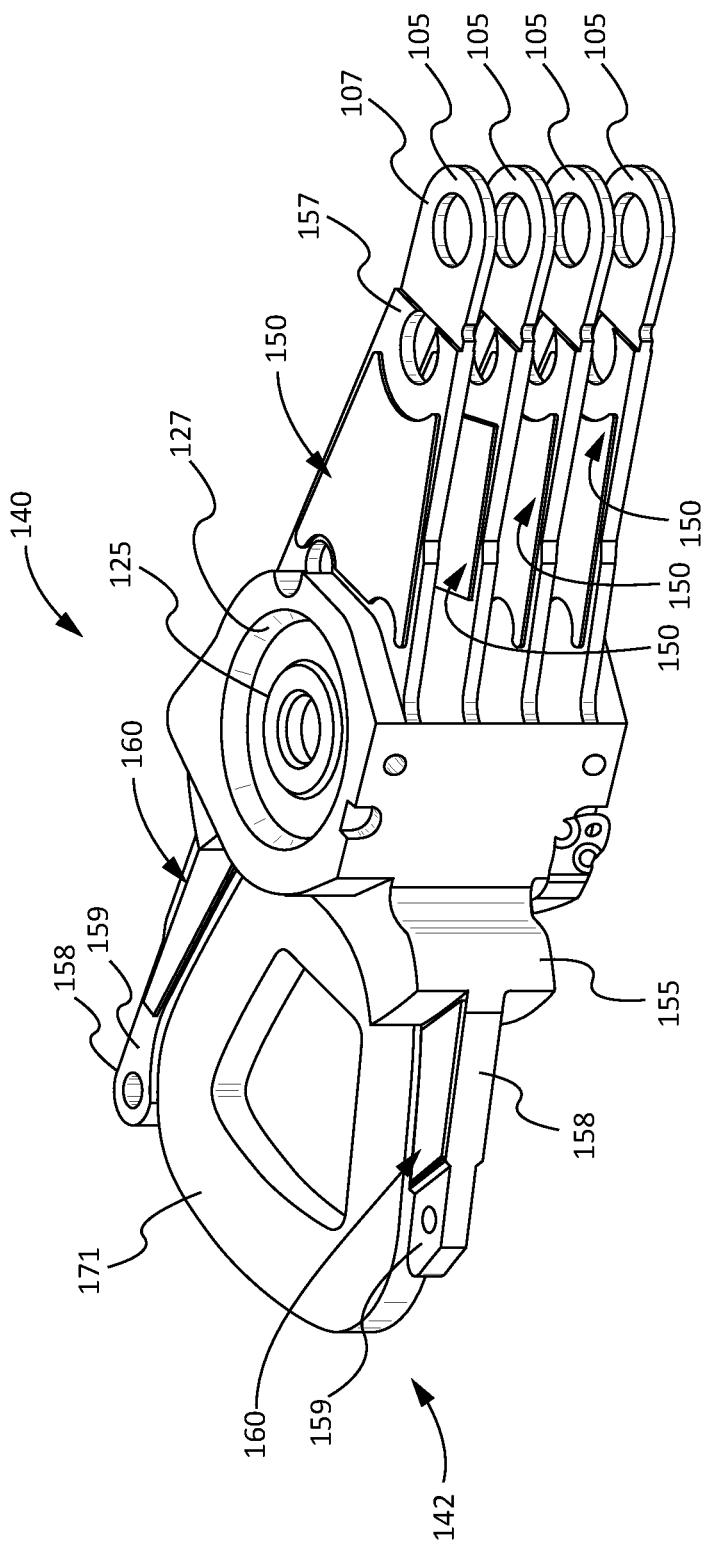
FIG. 2 is a top perspective view of an actuator assembly, with vibration dampers, of a magnetic storage device according to one embodiment.
Figure 3:
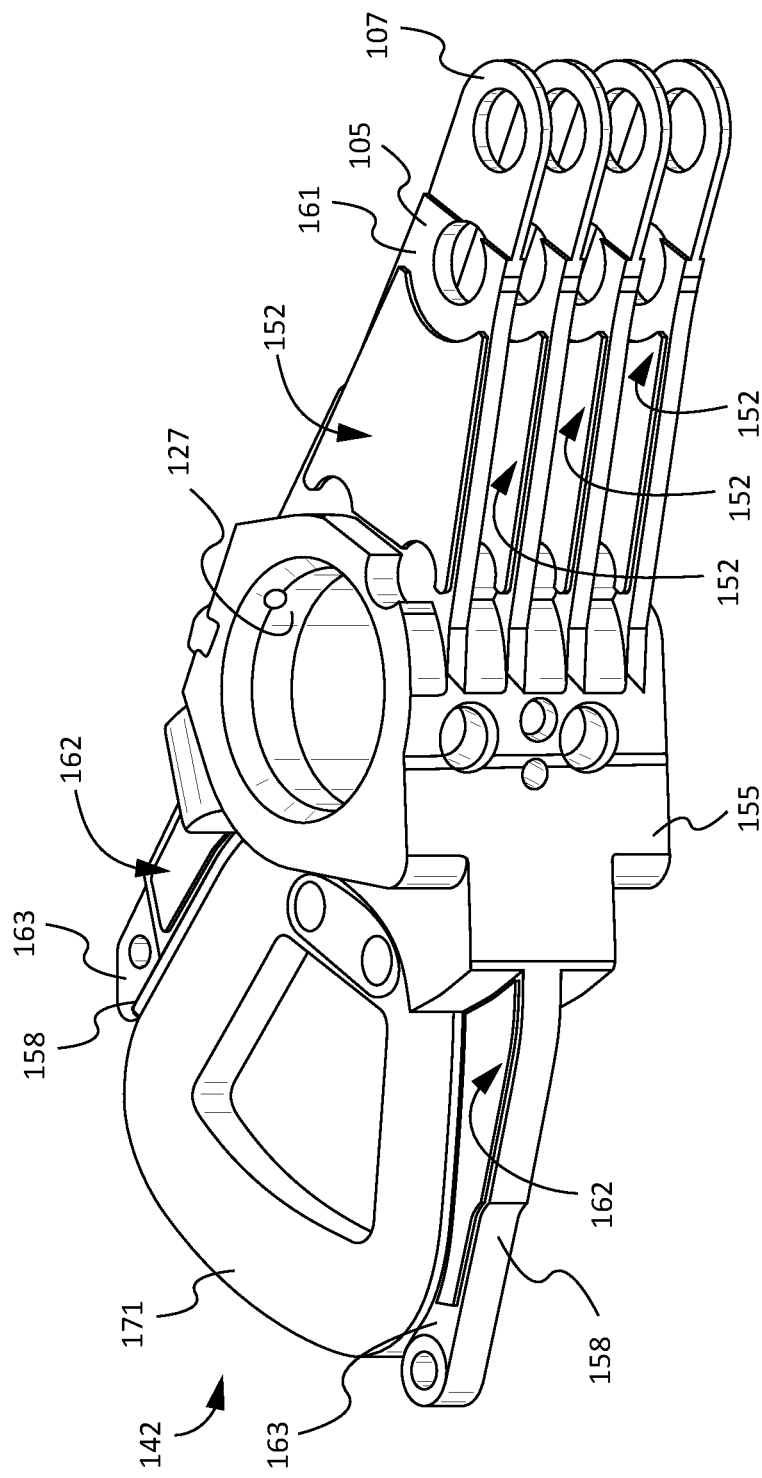
FIG. 3 is a bottom perspective view of an actuator assembly, with vibration dampers, of a magnetic storage device according to one embodiment.

To reduce vibrations in the actuator assembly 140, the actuator assembly includes a plurality of vibration dampers or damper sets. Each vibration damper set includes two or more vibration dampers. For example, referring to FIG. 2, a plurality of top vibration dampers 150 are shown secured to the top surfaces 157 of respective armatures 105. In the illustrated embodiment, the top vibration dampers 150 are positioned on the top surfaces 157 between the aperture 127 of the base 155 and the end portions 107 of the armatures 105. Similarly, as shown in FIG. 3, a plurality of bottom vibration dampers 152 are secured to the bottom surfaces 161 of respective armatures 105. The top and bottom vibration dampers 150, 152 of each armature 105 can be defined collectively as a vibration damper set or pair.

Moreover, the top and bottom vibration dampers 150, 152 of each vibration damper set are configured differently. In other words, the top vibration damper 150 secured to a given armature 105 has a first configuration and the bottom vibration damper 152 secured to the same armature has a second configuration that is different than the first configuration. In some implementations, the configuration of each vibration damper can be defined as at least one of a material composition, thickness, and shape of the vibration damper. Accordingly, the configuration of a top vibration damper is different than the configuration of a bottom vibration damper when one or more of the material composition, thickness, and shape of the top vibration damper is different than the material composition, thickness, and shape, respectively, of the bottom vibration damper. In other implementations, the configuration of each vibration damper can be defined according to other characteristics as desired. In some embodiments, the configuration of one damper is considered different than another damper when the configurations vary substantially. According to some implementations, two configurations vary substantially when a differing characteristic varies by more than a certain percentage threshold. In one implementation, the percentage threshold can be about 5%. In yet some implementations, the configuration of one damper is considered different than another damper when the configurations vary more than nominally.

Each damper includes a constraining layer and an adhesive layer. Generally, the constraining or stiffener layer is secured to a surface of a component of a storage device by the adhesive layer. The adhesive layer is applied directly onto the surface of the component. The constraining layer is coupled directly onto the adhesive layer, such that the adhesive layer is positioned between the surface of the component and the constraining layer.

Figure 4:
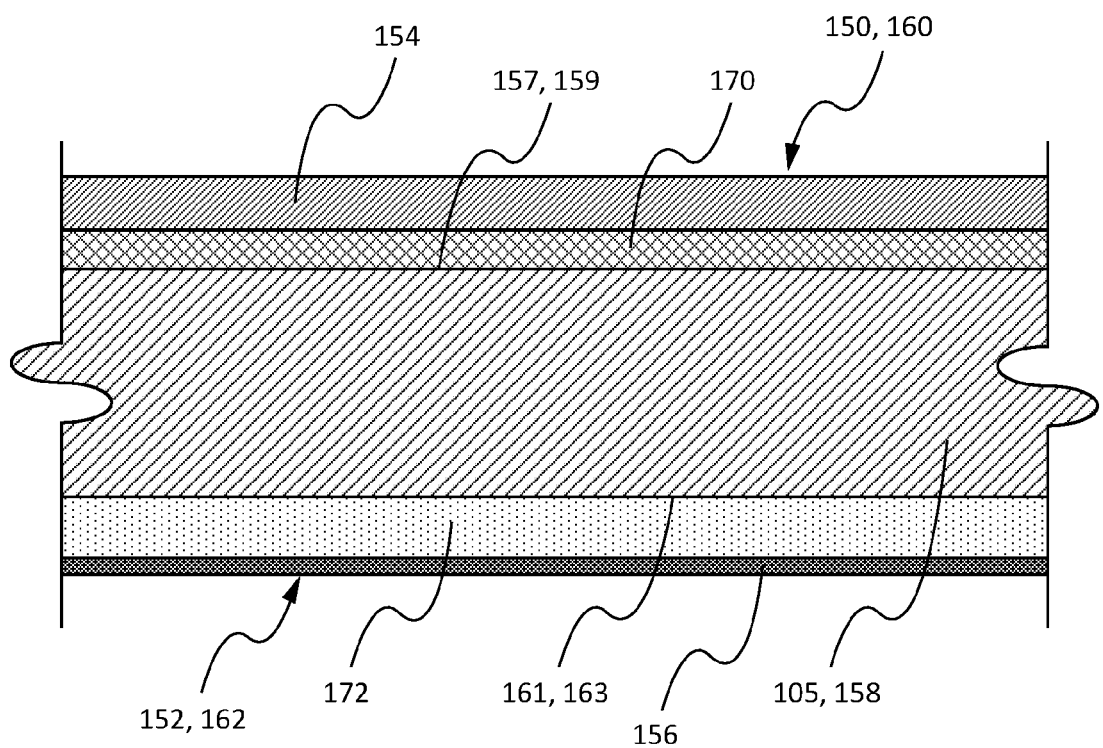
FIG. 4 is a cross-sectional side view of a component, with vibration dampers, of a magnetic storage device according to another embodiment.

In one exemplary embodiment shown in FIG. 4, the top vibration damper 150 includes a constraining layer 154 and an adhesive layer 170. The constraining layer 154 is secured to the top surface 157 of the armature 105 of the HDD 100. The adhesive layer 170 is applied directly onto the top surface 157 of the armature 105. The constraining layer 154 is coupled directly onto the adhesive layer 170, such that the adhesive layer is positioned between the top surface 157 of the armature 105 and the constraining layer. The bottom vibration damper 152 also includes a constraining layer 156 and an adhesive layer 172. The constraining layer 156 is secured to the bottom surface 161 of the armature 105 of the HDD 100. The adhesive layer 172 is applied directly onto the bottom surface 161 of the armature 105. The constraining layer 156 is coupled directly onto the adhesive layer 172, such that the adhesive layer is positioned between the bottom surface 161 of the armature 105 and the constraining layer. As described above, the top and bottom vibration dampers 150, 152 can be a set of vibration dampers with the constraining layer 154 and adhesive layer 170 of the top vibration damper 150 being first or top constraining and adhesive layers, and the constraining layer 156 and adhesive layer 172 of the bottom vibration damper 152 being second or bottom constraining and adhesive layers.

The adhesive layers 170, 172 of the top and bottom vibration dampers 150, 152 are made from an adhesive material with vibration damping properties. Accordingly, adhesive material of the adhesive layers 170, 172 provides both adhesion properties for adhering to the top and bottom surfaces 157, 161, respectively, and to the constraining layers 154, 156, respectively, and vibration damping properties for damping vibrations in the armature 105. Generally, the adhesive material has sufficient adhesion properties to adequately secure the constraining layers 154, 156 to the top and bottom surfaces 157, 161, respectively. In some embodiments, the constraining layers 154, 156 are secured to the top and bottom surfaces 157, 161, respectively, solely by the respective adhesive layers 170, 172. In other words, according to such embodiments, no fasteners or other securing means, other than the adhesive layers 170, 172, are used to secure the constraining layers 154, 156 to the top and bottom surfaces 157, 161. In these embodiments, the adhesive layers 170, 172 are positioned directly between the constraining layers 154, 156, respectively, and the top and bottom surfaces 157, 161, respectively. In some implementations, one or both the adhesive layers 170, 172 can be made from multiple stacked adhesive layers of the same or different configuration.

The adhesive materials of the adhesive layers 170, 172 can be any of various adhesives having desired damping properties. In some implementations, the adhesive materials include a visco-elastic adhesive (e.g., a material that exhibits both viscous and elastic characteristics when undergoing deformation). The visco-elastic material can be any of various visco-elastic materials, such as visco-elastic damping polymers (e.g., Damping Polymer 242 manufactured by 3M™), and the like. Often, the vibration damping characteristics of the adhesive materials of the adhesive layers 170, 172 can vary based on the temperature of the adhesive materials, and other factors. For example, some adhesives may dampen vibrations more efficiently at higher temperatures than lower temperatures, and other adhesives may dampen vibrations more efficiently at lower temperatures than higher temperatures. Although both the adhesive layers 170, 172 are made from an adhesive with vibration damping properties, in some implementations, the top adhesive layer 170 is made from a first adhesive and the bottom adhesive layer 172 is made from a second adhesive that is different than the first adhesive. For example, the first adhesive can have a chemical composition that is different than the second adhesive. In one example, the first adhesive can have different adhesion properties than the second adhesive. In yet another example, the first adhesive can have different damping properties than the second adhesive. In any of the above examples, the top adhesive layer 170 is considered to be configured differently than the bottom adhesive layer 172. However, in alternative embodiments, the first and second adhesives can be the same.

In addition to the type of adhesive, the damping characteristics of the adhesive layers 170, 172 may depend on the thickness of the layers. The adhesive layers 170, 172 can have any of various thicknesses based on desired damping characteristics. For example, in some specific implementations, the thickness of each adhesive layer 170, 172 can vary between about 0.015 mm and about 0.1 mm. According to some implementations, the first and second adhesive layers 170, 172 have different thicknesses. As shown in FIG. 4, the first adhesive layer 170 may be thicker than the second adhesive layer 172. However, in other implementations, the second adhesive layer 172 may be thicker than the first adhesive layer 170. In some embodiments, the first and second adhesive layers 170, 172 can have the same thickness.

The damping characteristics of the adhesive layers 170, 172 may also depend on the shape of the layers. As defined herein, according to some implementations, the shape of an adhesive layer is the shape of the footprint of the adhesive layer, or the shape of the adhesive layer in plan view. Additionally, in certain implementations, the shape of an adhesive layer can be the cross-sectional shape of the adhesive layer taken along a plane parallel to the surface upon which the adhesive is secured. Because vibrations behave differently when interacting with differently sized and shaped boundaries of a layer, the shape of or features along the outer peripheries of the adhesive layers affect the vibration attenuating or vibration damping properties of the layers. According to some implementations, the first and second adhesive layers 170, 172 of a given set have different shapes. As shown in FIG. 2, for example, the top adhesive layer 170 of the damper set on an adjacent armature 105 below the topmost armature 105 has a shape that is different than the shapes of the other top adhesive layers 170, as well as the shape of the bottom adhesive layer 172 of the same set (see, e.g., FIG. 3). Alternatively, in some embodiments, the first and second adhesive layers 170, 172 can have the same shapes.

The constraining layers 154, 156 of the top and bottom vibration dampers 150, 152 are made from materials more rigid or stiff than the adhesive materials of the adhesive layers 170, 172. Because the constraining layers 154, 156 are stiffer than the respective adhesive layers 170, 172, the constraining layers 154, 156 constrain (e.g., limit) the deformation of the adhesive layers 170, 172 as the adhesive layers undergo shear deformation when the armature 105 vibrates during operation of the HDD 100. In some implementations, one or both the constraining layers 154, 156 can be made from multiple stacked constraining layers of the same or different configuration.

The materials of the constraining layers 154, 156 can be any of various materials having desired constraining properties. In some implementations, the constraining layers 154, 156 are made from a non-magnetic metal, such as stainless steel, aluminum, and the like, or a non-metal, such as plastic, composite, ceramic, and the like. Often, the constraining properties (e.g., stiffness) of the materials of the constraining layers 154, 156 can vary based on the temperature of the adhesive materials, and other factors. For example, some constraining materials may be less stiff at higher temperatures than lower temperatures. Although both the constraining layers 154, 156 are made from a relatively stiff, non-magnetic material, in some implementations, the top constraining layer 154 is made from a first constraining material and the bottom constraining layer 156 is made from a second constraining material that is different than the first constraining material. For example, the first constraining material can have a chemical composition that is different than the second constraining material. In one example, the first constraining material can have different stiffness properties than the second constraining material. In any of the above examples where the constraining materials are different, the top constraining layer 154 is considered to be configured differently than the bottom constraining layer 156. However, in alternative embodiments, the first and second constraining materials can be the same.

In addition to the type of material, the constraining characteristics of the constraining layers 154, 156 may depend on the thickness of the layers. The constraining layers 154, 156 can have any of various thicknesses based on desired constraining or stiffness characteristics. For example, in some specific implementations, the thickness of each constraining layer 154, 156 can vary between about 0.015 mm and about 0.1 mm. According to some implementations, the first and second constraining layers 154, 156 have different thicknesses. As shown in FIG. 4, the first constraining layer 154 may be thicker than the second constraining layer 156. However, in other implementations, the second constraining layer 156 may be thicker than the first constraining layer 154. In some embodiments, the first and second constraining layers 154, 156 can have the same thickness.

The constraining characteristics of the constraining layers 154, 156 may also depend on the shape of the layers. As defined herein, according to some implementations, the shape of a constraining layer is the shape of the footprint of the constraining layer, or the shape of the constraining layer in plan view. Additionally, in certain implementations, the shape of a constraining layer can be the cross-sectional shape of the constraining layer taken along a plane parallel to the surface upon which the adhesive layer is secured. Because the stiffness of an object may vary according to differently sized and shaped boundaries of the object, the shape of or features along the outer peripheries of the constraining layers affect the constraining properties (e.g., stiffness) of the layers. According to some implementations, the first and second constraining layers 154, 156 of a given set have different shapes. As shown in FIG. 2, for example, the top constraining layer 154 of the damper set on an adjacent armature 105 below the topmost armature 105 has a shape that is different than the shapes of the other top constraining layers 154, as well as the shape of the bottom constraining layer 156 of the same set (see, e.g., FIG. 3). Alternatively, in some embodiments, the first and second constraining layers 154, 156 can have the same shapes.

As defined herein, the configuration of a first vibration damper is different than a second vibration damper if at least one of (i) the configuration of the adhesive layer of the first vibration damper is different than the configuration of the adhesive layer of the second vibration damper; and (ii) the configuration of the constraining layer of the first vibration damper is different than the configuration of the constraining layer of the second vibration damper. In one implementation, only the configuration of the adhesive layer of the first vibration damper is different than the configuration of the adhesive layer of the second vibration damper. In another implementation, only the configuration of the constraining layer of the first vibration damper is different than the configuration of the constraining layer of the second vibration damper. According to yet another implementation, both the configuration of the adhesive layer of the first vibration damper is different than the configuration of the adhesive layer of the second vibration damper, and the configuration of the constraining layer of the first vibration damper is different than the configuration of the constraining layer of the second vibration damper.

The configuration of the adhesive layer of a first vibration damper is different than the configuration of the adhesive layer of a second vibration damper if the adhesive layer of the first vibration damper has a different material composition, thickness, shape and/or other characteristic than the adhesive layer of the second vibration damper. Similarly, the configuration of the constraining layer of a first vibration damper is different than the configuration of the constraining layer of a second vibration damper if the constraining layer of the first vibration damper has a different material composition, thickness, shape and/or other characteristic than the constraining layer of the second vibration damper.

As mentioned above, vibration dampers with different configurations may produce different vibration damping characteristics. Often, the vibration damping characteristics of vibration dampers are dependent on external factors, such as the operating temperature of the layers of the vibration dampers. For example, for a given temperature, one vibration damper may produce certain damping characteristics that are different than the damping characteristics produced by a differently configured vibration damper at the same temperature. In contrast, one vibration damper at a given temperature (or temperature range) may produce the same damping characteristics as a differently configured vibration damper at a different temperature (or temperature range). Accordingly, in some implementations, to ensure similar damping characteristics across a broader temperature range, a vibration damper set with differently configured vibration dampers can be applied to an armature (or other component) in an opposing manner as described above. Referring to FIG. 4 above, in one specific implementation, the top vibration damper 150 can be configured to achieve a certain vibration reduction factor at a relatively higher range of temperatures, and the bottom vibration damper 152 can be configured to achieve the same vibration reduction factor at a relatively lower range of temperatures. The higher and lower range of temperatures can be contiguous in some embodiments.

Although the above described embodiments refer to the placement of differently configured vibration dampers on opposing surfaces of armatures of an actuator assembly of an HDD, in other embodiments, the differently configured vibration dampers can be placed on opposing surfaces of other moving (or non-moving) components of an HDD, data storage device, or other electronic device to achieve similar results without departing from the essence of the present disclosure. For example, as shown in FIGS. 2-4, top vibration dampers 160 are shown secured to top surfaces 159 of respective coil supports 158. Similarly, bottom vibration dampers 162 are secured to the bottom surfaces 163 of respective coil supports 158. The top and bottom vibration dampers 160, 162 of each coil support 158 can be defined collectively as a vibration damper set or pair. The features of the top and bottom vibration dampers 160, 162 are similar to analogous features of the top and bottom vibrations dampers 150, 152. This fact is evidenced by the incorporation of the reference numbers for the analogous features of the coil supports 158 and top and bottom vibration dampers 160, 162 into FIG. 4.

Although some of the above embodiments are described and shown to place differently configured dampers on opposing or opposite surfaces of a component, in some implementations it may be desirable to place differently configured dampers on adjacent or orthogonal surfaces, such as a top surface and a perpendicular side/edge surface.

Reference throughout this specification to "one embodiment," "an embodiment," or similar language means that a particular feature, structure, or characteristic described in connection with the embodiment is included in at least one embodiment of the present disclosure. Thus, appearances of the phrases "in one embodiment," "in an embodiment," and similar language throughout this specification may, but do not necessarily, all refer to the same embodiment.

In the above description, certain terms may be used such as "top," "bottom," "up," "down," "upper," "lower," "horizontal," "vertical," "left," "right," and the like. These terms are used, where applicable, to provide some clarity of description when dealing with relative relationships. But, these terms are not intended to imply absolute relationships, positions, and/or orientations. For example, with respect to an object, a "top" surface can become a "bottom" surface simply by turning the object over. Nevertheless, it is still the same object. Further, the terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise. Further, the term "plurality" can be defined as "at least two."

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other, but having one or more additional elements between the coupled elements. Also, securing one element to another element can include direct and indirect securing. Additionally, as used herein, "adjacent" does not necessarily denote contact (i.e., one element can be adjacent to another without being in contact with the other).

As used herein, the phrase "at least one of", when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required. For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

The subject matter of the present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

What is claimed is:

1. An actuator assembly for a magnetic storage device, comprising:
   at least one armature that supports a read-write head, wherein the at least one armature comprises a top surface and a bottom surface opposing the top surface;
   a first constraining layer secured to the top surface by a first adhesive layer, the first adhesive layer being positioned between the top surface and the first constraining layer; and
   a second constraining layer secured to the bottom surface by a second adhesive layer, the second adhesive layer being positioned between the bottom surface and the second constraining layer;
   wherein at least one of (i) the first constraining layer is made from a first material and the second constraining layer is made from a second material that is different than the first material; and (ii) the first adhesive layer is made from a first adhesive and the second adhesive layer is made from a second adhesive that is different than the first adhesive.

2. The actuator assembly of claim 1, wherein the first and second constraining layers each comprises a rigid sheet.

3. The actuator assembly of claim 2, wherein the rigid sheet is made from a metallic material.

4. The actuator assembly of claim 1, wherein the first constraining layer has a first thickness and the second constraining layer has a second thickness that is different than the first thickness.

5. The actuator assembly of claim 1, wherein the first constraining layer has a first shape and the second constraining layer has a second shape that is different than the first shape.

6. The actuator assembly of claim 1, wherein the first and second adhesive layers are made from a same adhesive.

7. The actuator assembly of claim 1, wherein the first and second adhesive layers each is made from a visco-elastic adhesive.

8. The actuator assembly of claim 1, wherein the first and second adhesive layers have a lower stiffness than the first and second constraining layers, respectively.

9. The actuator assembly of claim 1, wherein the first adhesive layer has a first thickness and the second adhesive layer has a second thickness that is different than the first thickness.

10. The actuator assembly of claim 1, wherein the first adhesive layer has a first shape and the second adhesive layer has a second shape that is different than the first shape.

11. The actuator assembly of claim 1, wherein the first and second constraining layers are made from a same material.

12. The actuator assembly of claim 1, wherein the first constraining layer is made from a first material and the second constraining layer is made from a second material that is different than the first material, and the first adhesive layer is made from a first adhesive and the second adhesive layer is made from a second adhesive that is different than the first adhesive.

13. The actuator assembly of claim 1, wherein the first adhesive has different vibration damping characteristics than the second adhesive.

14. The actuator assembly of claim 1, wherein the first adhesive dampens vibrations more efficiently at higher temperatures than at lower temperatures, and wherein the second adhesive dampens vibrations more efficiently at lower temperatures than at higher temperatures.

15. A magnetic storage device, comprising:
   at least one magnetic disk;
   at least one armature rotatably movable relative to the at least one magnetic disk, the at least one armature comprising a first surface and a second surface opposing the first surface;
   a first vibration damper secured to the first surface, the first vibration damper comprising a first constraining layer and a first adhesive layer positioned between the first surface and the first constraining layer; and
   a second vibration damper secured to the second surface, the second vibration damper comprising a second constraining layer and a second adhesive layer positioned between the second surface and the second constraining layer;
   wherein at least one of (i) the first constraining layer is made from a first material and the second constraining layer is made from a second material that is different than the first material; and (ii) the first adhesive layer is made from a first adhesive and the second adhesive layer is made from a second adhesive that is different than the first adhesive.

16. The magnetic storage device of claim 15, wherein the first adhesive has different vibration damping characteristics than the second adhesive.

17. The magnetic storage device of claim 15, wherein the first adhesive dampens vibrations more efficiently at higher temperatures than at lower temperatures, and wherein the second adhesive dampens vibrations more efficiently at lower temperatures than at higher temperatures.

18. An apparatus for damping vibrations in an actuator assembly for a magnetic storage device, the actuator assembly comprising at least one armature comprising a top surface and a bottom surface opposing the top surface, the apparatus comprising:
 a first rigid sheet secured to the top surface by a first visco-elastic adhesive, the first visco-elastic adhesive being positioned between the top surface and the first rigid sheet; and
 a second rigid sheet secured to the bottom surface by a second visco-elastic adhesive, the second visco-elastic adhesive being positioned between the bottom surface and the second rigid sheet;
 wherein at least one of (i) the first rigid sheet is made from a first material and the second rigid sheet is made from a second material that is different than the first material; and (ii) the first visco-elastic adhesive is made from a first adhesive and the second visco-elastic adhesive is made from a second adhesive that is different than the first adhesive.

19. The apparatus of claim 18, wherein the first visco-elastic adhesive has different vibration damping characteristics than the second visco-elastic adhesive.

20. The apparatus of claim 18, wherein the first visco-elastic adhesive dampens vibrations more efficiently at higher temperatures than at lower temperatures, and wherein the second visco-elastic adhesive dampens vibrations more efficiently at lower temperatures than at higher temperatures.

* * * * *